April 28, 1970     T. L. KAMINSKI     3,508,556

CORN SHELLER

Filed Jan. 2, 1968

Inventor
Tony L. Kaminski
By Kenneth Clarkins
Attorney

United States Patent Office 3,508,556
Patented Apr. 28, 1970

3,508,556
CORN SHELLER
Tony L. Kaminski, Milwaukee, Wis., assignor to Allis-Chalmers Manufacturing Company, Milwaukee, Wis.
Filed Jan. 2, 1968, Ser. No. 694,913
Int. Cl. A01f 11/06
U.S. Cl. 130—8                                  3 Claims

ABSTRACT OF THE DISCLOSURE

A method of and mechanism for shelling corn in which a combination of compression and rotation of the ear is used.

---

Most corn shellers subject the ears of corn to such rough treatment that the surfaces of the kernels are scratched, cracked or broken, providing openings therein for the entry of fungus or other organisms resulting in spoilage and deterioration. This results in lowering the quality of the corn as a food product and if the corn is desired as seed eliminating a good percentage thereof as being useful therefor.

An object of this invention is to provide a corn sheller which produces less kernel damage compared to prior shellers.

Another object of this invention is to provide a corn sheller wherein each ear of corn is subjected simultaneously to both radial compression and to rotation about its longitudinal axis.

Another object of this invention is to provide a corn sheller capable of efficiently shelling high moisture corn with a minimum of kernel damage.

It is therefore an object of this invention to provide an improved corn sheller wherein the ears of corn are so handled in the shelling process that substantially no damage is done to the kernels thereby resulting in a high quality feed or seed.

A further object of this invention is to provide a corn sheller which efficiently shells corn of all moisture levels including high moisture corn and relatively dry corn.

With the foregoing and other objects in view, the invention will be more fully described hereinafter and will be particularly pointed out in the claims appended thereto.

In the drawings herein like symbols refer to like or corresponding parts throughout the several views.

Figure 1:
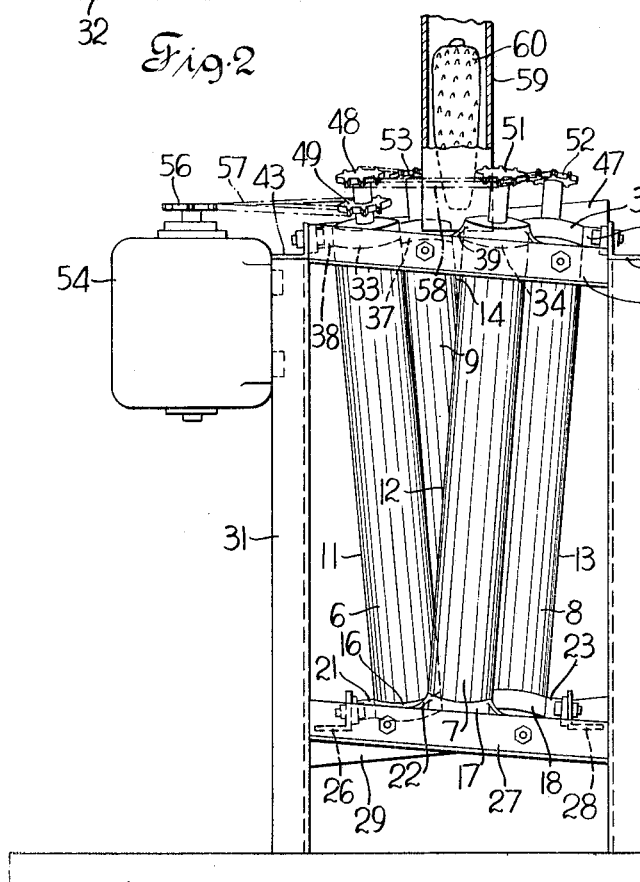
FIG. 1 is a side elevation of the preferred embodiment of the invention with some parts removed for clarity of illustration and others shown in section.

In FIG. 1 a plurality of rolls 6, 7, 8 and 9 generally vertically extending are provided. Each of these rolls are provided with a rubber covered peripheral surface 11, 12, 13 and 14, respectively, which functions to provide better gripping of the ears of corn. However, this embodiment will function satisfactorily without such rubber coverings. These rolls are journaled in lower bearings 16, 17, 18 and 19, respectively, carried by loop members 21, 22, 23 and 24, respectively, which in turn are bolted to transverse frame members 26, 27, 28 and 29, respectively. Frame members 26, 27, 28 and 29 are attached to vertical frame members 31 by conventional means and frame members 31 are supported by base 32 by conventional means, as by welding.

The upper ends of rolls 6, 7, 8 and 9 are journaled in bearings 33, 34, 36 and 37 carried by loop support members 38, 39, 41 and 42, respectively, which are bolted to upper transverse frame members 43, 44, 46 and 47, respectively. Vertical frame members 31 support transverse frame members 43, 44, 46 and 47 by conventional means such as welding.

The lower ends of rolls 6, 7, 8 and 9 are so mounted that they provide an opening between opposed rolls of approximately 1¼" and these rolls are so mounted that at their upper ends they provide an opening between opposed rolls of approximately 2½". In other words, this upper opening is large enough to permit the introduction of an unshelled ear of corn in the opening between rolls and the lower opening is of a size large enough to permit the passage of a cob of a shelled ear of corn.

The upper end of roll 6 has two sprockets 48 and 49 attached thereto. Rolls 7, 8 and 9 have sprockets 51, 52 and 53, respectively, attached to the upper end thereof. A suitable source of power is provided and as illustrated in this embodiment as electric motor 54, is attached to frame 31 and is provided with a sprocket 56 which is drivingly engaged with sprocket 49 by means of chain 57. Sprocket 48 is drivingly engaged with sprockets 51, 52 and 53 by means of chain 58.

A chute 59 is mounted in vertical relation to the embodiment to provide a supply of ears of corn 60 to the opening between the rolls as is illustrated in FIG. 1.

It is to be noted that the upper ends of shafts 6, 7, 8 and 9 are skewed around relative to the lower ends. This skewing is of the order of 5° and was done for the purpose of providing a positive feed of ears of corn downwardly between the rolls. This feed from the skewing is in addition to gravity. In other words, this skewing of the rolls provides a component of force tending to move the ears of corn from the upper portion of the rolls to and out from the lower portion of the rolls.

From the drawing, it is seen that the sprockets on the rolls are all of the same size so that the peripheral speed of the rolls is the same and the four rolls are all driven in the same direction.

Figure 5:
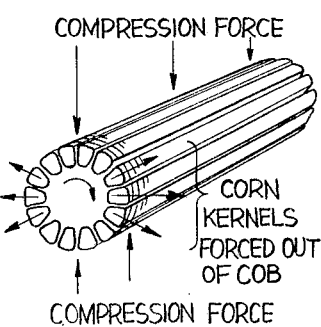
FIG. 5 is a diagrammatic perspective view showing how a radial force is applied to an ear of corn.

Referring to FIG. 1, ears of corn are introduced into the upper center portion of the sheller through chute 59 as illustrated in the drawing. The ear of corn descends by gravity until it contacts rolls 6, 7, 8 and 9. These rolls are rapidly spinning, having a peripheral velocity of approximately 3,000 feet per minute and when the ear of corn contacts the rolls, ear 60 starts to spin at almost the same high speed as the rolls. Due to the skewing of the rolls, a component of the compressive force is exerted by the rolls against the ear of corn and tends to move the ear downwardly along the major axis of the ear as it continues to spin. The lower the ear is moved, the greater is the compressive force being exerted against the spinning ear. Ultimately this force is great enough to cause the kernels to separate from the cob of the ear and drop to a position below the sheller where the ear material can be collected and separated by conventional means. In other words, this compressive force acts on the kernels to wedge them out because the kernels are somewhat triangular in shape and are arranged in a circular configuration about the cob. The action of this force in shelling the kernels is best shown in FIG. 5. If desired, rolls 6, 7, 8 and 9 could be tapered instead of being cylindrical.

Figure 2:
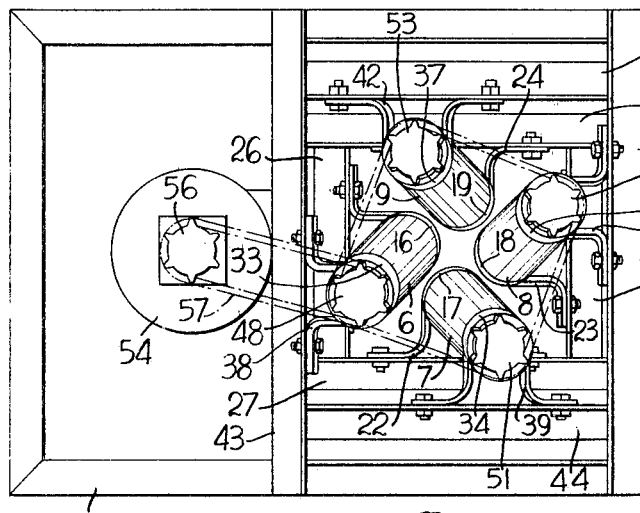
FIG. 2 is a plan view of the embodiment shown in FIG. 1 with the ear chute removed.
Figure 3:
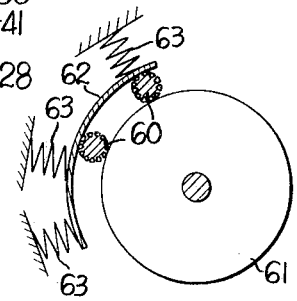
FIG. 3 is a diagrammatic plan view of an alternate embodiment of the invention.

FIG. 3 shows another embodiment of this invention wherein a driven drum 61 spins the ears of corn 60 and these ears of corn are biased into contact with drum 61 by means of an arcuate member 62 which is biased toward roll 61 by springs 63. Roll 61 is driven at a high rate of speed to provide a peripheral speed in the order of 3,000 feet per minute.

Figure 4:
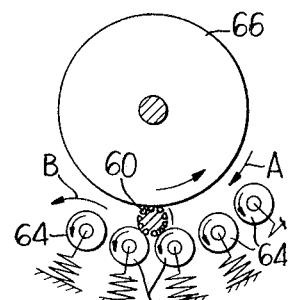
FIG. 4 is a diagrammatic plan view of an additional alternate embodiment of the invention.

FIG. 4 diagrammatically shows another embodiment of this invention. A plurality of nonpowered rollers 64 which are free to rotate and are biased radially toward the axis of rotation of drum 66 which is power driven. Drum 66 is driven at the same rate of speed that roll 61 was driven in FIG. 3. In fact, it has been found by experiment that the rolls in the various embodiments should be driven to provide the ears with a peripheral speed of approximately 3,000 feet per minute to obtain the best shelling.

Rolls 64 in FIG. 4 can be driven if desired and, if so, drum 66 preferably would be driven in the direction shown at a speed of approximately 2,500 feet per minute while rolls 64 would be driven in the same direction at a greater speed, such as 2,800 to 3,000 feet per minute. This combination would then function to receive ears of corn at the arrow marked A and discharge the corn cobs at the arrow marked B. The peripheral velocities of the drum 66 and rolls 64 differ slightly to provide a conveying action from A to B as already mentioned.

While preferred part structures, combinations and arrangements have been disclosed herein for accomplishing the stated objects, it is to be understood that variations in such parts and arrangements may be made without departing from the spirit and scope of the invention as defined in the accompanying claims.

The embodiments of the invention in which an exclusive property or privilege is claimed are defined as follows:

1. A corn sheller comprising a plurality of rapidly driven rolls extending generally vertically, said rolls being driven in the same direction and being spaced apart at the upper end to provide an entrance of a size substantially the diameter of unshelled ears of corn, said rolls being adapted to spin ears of corn about their principal axis at a peripheral speed substantially equal to the peripheral speed of said rolls, means in addition to gravity for moving ears of corn from the upper end to the lower end of said rolls, said rolls being spaced apart at the lower end a distance substantially equal to the diameter of a cob of corn so that a radial force is applied to ears of corn as the ears pass from the upper end to the lower end of said rolls, said means for moving said ears from said upper ends of said rolls to the lower ends includes mounting the rolls in skewed relation to the vertical to provide a force component feeding said ears downwardly, said component of force combining with said radial force to shell kernels of corn from the cob as the ear transits the sheller.

2. A corn sheller according to claim 1 and wherein the peripheral speed of said rolls is of the order of 3,000 feet per minute.

3. A corn sheller according to claim 1 and wherein the angle of skew of said rolls is of the order of 5 degrees to the vertical.

References Cited

UNITED STATES PATENTS

| | | | |
|---|---|---|---|
| 2,325,654 | 8/1943 | Borchers | 130—6 |
| 2,601,348 | 6/1952 | Weinhold | 130—6 |

FOREIGN PATENTS 344,433 11/1921 Germany.

ANTONIO F. GUIDA, Primary Examiner